J. R. SNYDER.
ENGINEER'S BRAKE VALVE.
APPLICATION FILED MAR. 30, 1912.
1,091,597.
Patented Mar. 31, 1914.
3 SHEETS—SHEET 1.
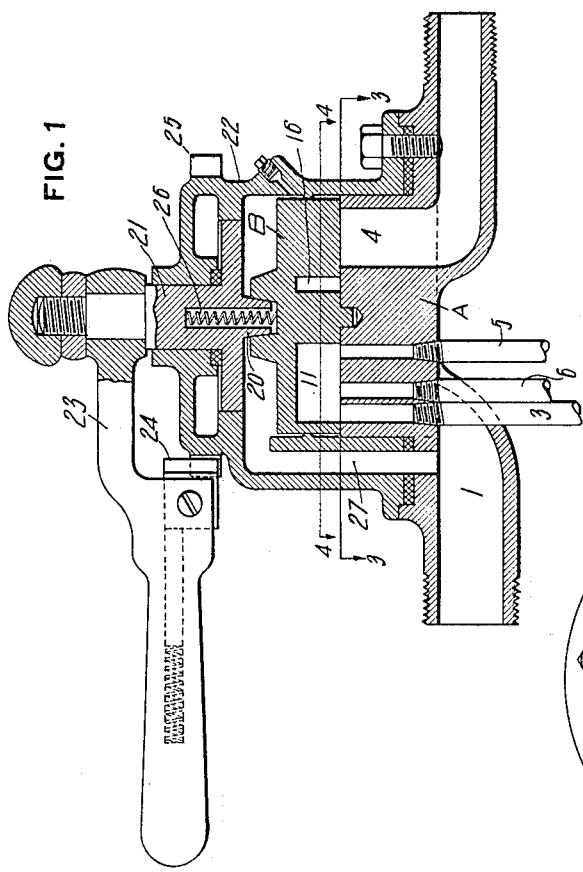
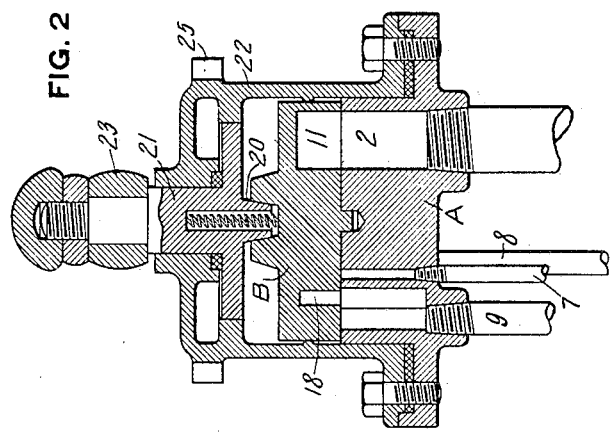
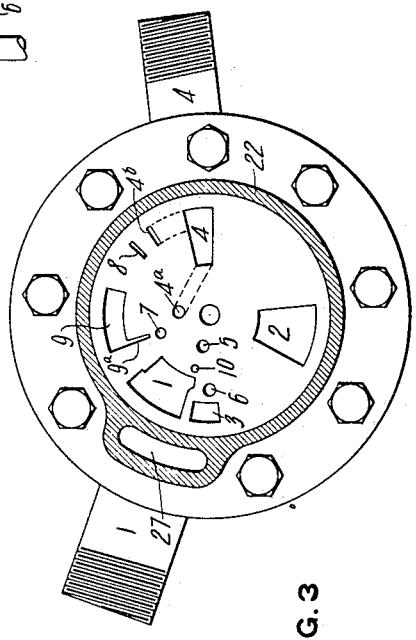
WITNESSES
INVENTOR

J. R. SNYDER.
ENGINEER'S BRAKE VALVE.
APPLICATION FILED MAR. 30, 1912.

1,091,597.

Patented Mar. 31, 1914.
3 SHEETS—SHEET 2.

WITNESSES

INVENTOR

J. R. SNYDER.
ENGINEER'S BRAKE VALVE.
APPLICATION FILED MAR. 30, 1912.

1,091,597.

Patented Mar. 31, 1914.

3 SHEETS—SHEET 3.

WITNESSES

INVENTOR

UNITED STATES PATENT OFFICE.

JACOB RUSH SNYDER, OF PITTSBURGH, PENNSYLVANIA, ASSIGNOR, BY MESNE ASSIGNMENTS, TO PITTSBURGH AIR BRAKE COMPANY, A CORPORATION OF PENNSYLVANIA.

ENGINEER'S BRAKE-VALVE.

1,091,597.

Specification of Letters Patent.

Patented Mar. 31, 1914.

Application filed March 30, 1912. Serial No. 687,537.

*To all whom it may concern:*

Be it known that I, JACOB RUSH SNYDER, a resident of Pittsburgh, in the county of Allegheny and State of Pennsylvania, have invented a new and useful Improvement in Engineers' Brake-Valves, of which the following is a specification.

This invention relates to engineers' brake valves for air brake systems.

The object of the invention is to provide an engineer's valve whereby better control of the engine and train, both jointly and separately, can be had than with engineers' valves as heretofore constructed.

The invention comprises a valve having cavities and ports arranged and controlled as hereinafter described and claimed.

Figure 4:
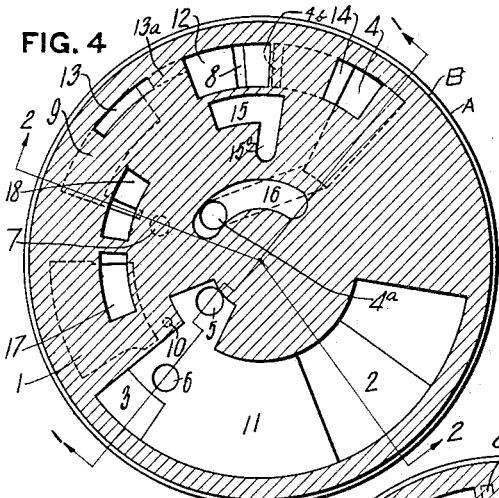
Figure 11:
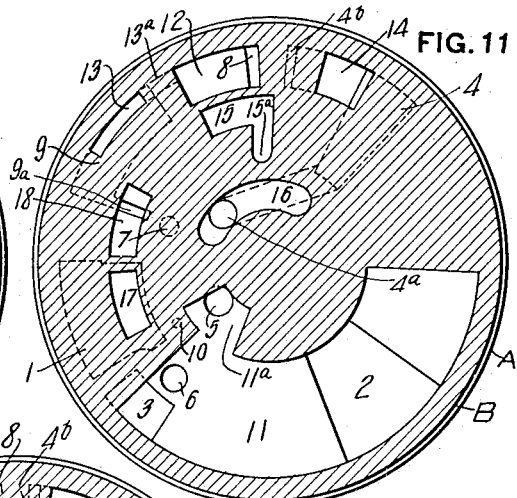
Figure 10:
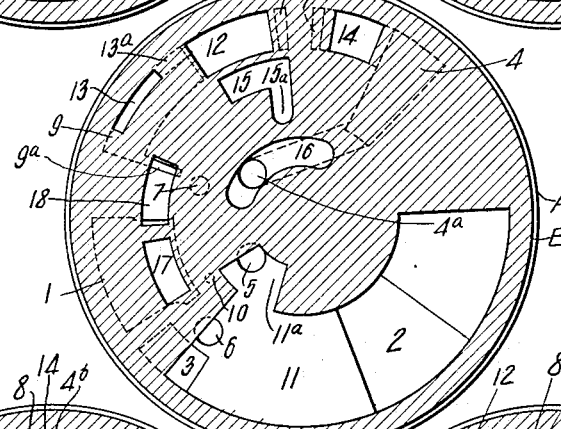
Figure 9:
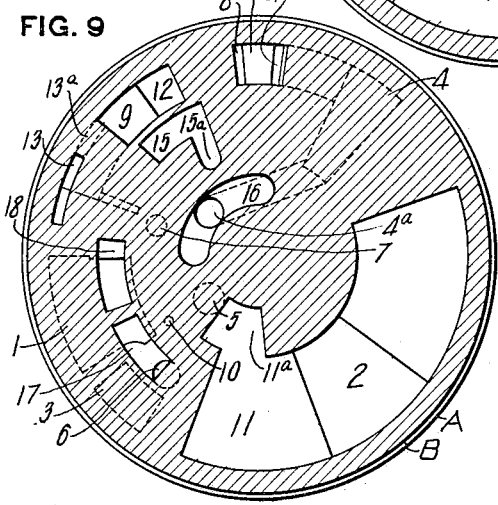
Figure 8:
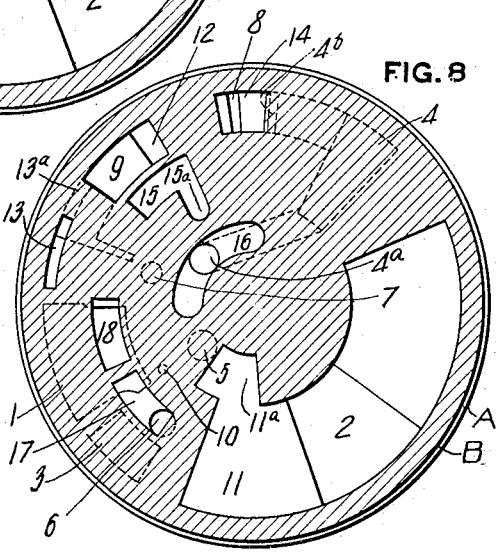

In the accompanying drawings, Figure 1 is a vertical section through the valve when in running position, taken on the line 1—1, Fig. 4; Fig. 2 is a similar view, taken on the line 2—2, Fig. 4; Fig. 3 is a horizontal section on the line 3—3, Fig. 1, showing the valve seat in plan view; and Figs. 4, 5, 6, 7, 8, 9, 10, 11, 12 and 13 are diagrammatic views showing the valve seat in plan and the rotary valve in horizontal section on the line 4—4, Fig. 1, and illustrating the different positions of the valve.

The general type of valve is not materially different from that of existing forms of engineers' brake valves of what are known as the rotary type. The essentials of the valve comprise the valve seat A provided with the necessary ports and passages, and the rotary disk valve B coöperating with the seat and provided with the necessary cavities to effect the proper combination between the ports in the valve seat.

The valve seat is provided with ports as follows: large port 1 connected directly to the main reservoir; large port 2 connected to the train pipe, preferably through an emergency cut-off valve such as is illustrated, described and claimed in my application filed March 30, 1912, Serial No. 687,536; a smaller port 3 also connected to the main reservoir by way of a feed valve instead of directly as is port 1; a port 4 forming the exhaust to the atmosphere and connected by underneath passages to port $4^a$ located relatively near the center of the valve seat and small port $4^b$ located adjacent the outer edge of the valve seat; a port 5 located relatively near to the center of the valve seat and connected to the equalizing reservoir; a port 6 located near the main reservoir ports 1 and 3 and connected to the emergency cut-off valve heretofore referred to and by means of which fluid pressure is admitted to the steam cut-off valve and also to the engine brake cylinder in case of bursting of a hose or the like emergency; a small port 7 having direct connection to the steam cut-off valve; a small port 8 closely adjacent the exhaust port $4^b$ and connected to a by-pass release pipe from the engine brake cylinder; a relatively large port 9 of general arc shape and having at one end a radially inwardly extending portion $9^a$ and connecting to the engine brake cylinder; and a small exhaust or warning port 10.

The rotary disk valve B is provided on its lower face with the following cavities, none of which extend through the valve, to wit:—the large cavity 11 of general arc shape provided at its end with the inwardly extending portion $11^a$; a smaller arc shaped cavity 12 located substantially diametrically opposite cavity 11; another still smaller arc shaped cavity 13 adjacent the cavity 12 and connected thereto by a passage $13^a$; a cavity 14 on the opposite side of cavity 12 from cavity 13 and at about the same radial distance from the center of the disk; a cavity 15 radially inwardly from cavity 12 and also of general arc shape and provided at one end with the inwardly extended portion $15^a$; an arc shaped cavity 16 inwardly from cavity 15 and relatively close to the center of the disk; and a pair of arc shaped cavities 17 and 18, equi-distant from the center and in close proximity to each other.

The rotary disk may be actuated in any way, such as is usual and as indicated in the drawings, by means of key 20 fitting a socket in the upper face of the disk and provided with a stem 21 extending upwardly through the casing 22 and having attached to its upper end the operating handle 23 provided with spring pressed dog 24 for engaging the notched segment 25, all as is common practice with engineers' brake valves. The rotary disk B is held to the seat A by the combined pressure of spring 26 and main reservoir pressure which passes from connection 1 through vertical passage 27 to the upper face of the rotary disk, all as is common in engineers' brake valves and as will be readily understood by those skilled in the art.

The valve described has ten positions, as follows:—

(1). Running position, shown in Figs. 1, 2 and 4. In this position, the large cavity 11 of the rotary disk with its extensions 11$^a$ connects port 3 coming from the main reservoir by way of the feed valve, to train pipe port 2, equalizing reservoir port 5, and emergency cut-off valve port 6. This charges the train pipe and equalizing reservoir to main reservoir pressure as reduced by the feed valve. The emergency cut-off valve in running position is in such position that the air entering port 6 is normally blocked at said valve, but should a hose burst or the conductor's valve be opened with the engineer's brake valve in this position, the emergency cut-off valve moves over so as to admit air entering through port 6 to the engine brake cylinder and to a steam cut-off valve and also to close the connection between the main reservoir and the train pipe, thereby conserving the main reservoir pressure. The engine brake cylinder port 9 is lapped by cavity 13 so that the brake cylinder air is vented through passage 13$^a$ to cavity 12 and thence to exhaust port 4$^b$. Cavity 12 also connects by-pass release pipe port 8 with exhaust port 4$^b$. Consequently, the engine brake cylinders are released. All other ports are blanked.

(2). Service position, shown in Fig. 5. In this position the valve has been rotated contra-clockwise from running position. The train pipe connection with the main reservoir is now broken. The equalizing reservoir port 5 is connected by cavity 16 to the exhaust port 4$^a$, thereby reducing the pressure in equalizing reservoir to operate the equalizing valve to reduce train pipe pressure and set the train brakes as is the usual practice in air brake systems. Main reservoir port 1 is lapped by cavity 13 so that main reservoir pressure flows through passage 13$^a$ into cavity 12 which overlaps the brake cylinder port 9, thereby setting the engine brakes directly from the main reservoir. Cavity 18 connects main reservoir port 1 with emergency cut-off valve port 6, but the latter valve is still in such position that the air entering port 6 is blocked at said valve. All other ports are blanked.

(3). Emergency position, shown in Fig. 6. This position is obtained by a rotation of the valve still farther contra-clockwise. In this position train pipe port 2 is connected by cavity 11 directly to the large exhaust port 4, thereby rapidly venting the train pipe and securing emergency application. Cavity 16 also connects equalizing reservoir port 5 with exhaust port 4$^a$, thereby also reducing pressure above the equalizing valve and causing the train pipe to be vented both at the engineer's valve and at the equalizing valve. Cavity 15 connects main reservoir port 1 with the radial extension 9$^a$ of brake cylinder port 9, thereby setting the engine brakes directly from the main reservoir. Cavity 15 also connects main reservoir port 1 to port 7, so that fluid pressure passes to the steam cut-off valve and cuts off the steam from the engine cylinders, obviating the necessity of the engineer giving attention to the throttle valve in time of emergency or imminent danger. All other ports are blanked.

(4). Full release position, shown in Fig. 7. In this position the valve is rotated slightly clockwise from running position. The cavity 11 of the rotary disk now connects main reservoir ports 1 and 3 with the train pipe port 2 and equalizing reservoir port 5, thereby charging both train pipe and equalizing reservoir and releasing the brakes in the well understood manner. The cavity 12 also connects by-pass release pipe port 8 with exhaust port 4$^b$, while the cavity 13 and passage 13$^a$ connect brake cylinder port 9 with cavity 12, thus releasing the engine brakes. The small exhaust port 10 is uncovered so that the main reservoir air rushes to the atmosphere as a warning signal to the engineer that the valve is in this position and warning him to put it back to running position as soon as the brakes are released in order to prevent overcharging the train pipe. After full release the valve is moved slightly contra-clockwise to running position, shown in Fig. 4, in which the main reservoir port 1 is blanked and communication had between the main reservoir and train pipe and equalizing reservoir by way of the feed valve and port 3.

(5). Positive lap position, shown in Fig. 8. This position is reached generally from service position by rotating the valve slightly clockwise, but may be reached from any application position. In this position, practically all of the ports are lapped so as to hold the brakes in whatever position they have been set by the previous position of the valve. The cavity 17, however, connects main reservoir port 1 with emergency cut-off valve port 6, so that should the train pipe burst from any cause, fluid pressure flowing through port 6 may actuate the steam cut-off valve and set the engine brakes, if not already set.

(6). Engine release and train lap position, shown in Fig. 9. This position can be reached from service application position by rotating the valve clockwise, in which case it releases the engine brakes and holds the train brakes. In this position, the cavity 14 connects by-pass release pipe port 8 with exhaust port 4b, thereby releasing the engine brakes. All other ports are blanked, except that cavity 17 connects main reservoir port 1 with emergency cut-off valve port 6, so that in the event of the bursting of a hose fluid pressure can flow to the steam cut-off valve.

(7). Engine application and train release position, shown in Fig. 10. This position can be reached either from running position, in which case it applies the engine brakes while holding the train brakes released, or from service position, in which case it releases the train brakes and continues the application of the engine brakes. In this position main reservoir port 1 is connected by cavity 18 to brake cylinder port 9, thereby applying, or continuing the application of, the engine brakes. Main reservoir port 3 is connected by cavity 11 to train pipe port 2 and equalizing reservoir port 5, thereby releasing the train brakes if they have been set, or holding them released in case they are already released. The emergency cut-off valve port 6 is open to main reservoir pressure. All other ports are blanked.

(8). Engine lap position, shown in Fig. 11. This position is assumed after the preceding position by slightly turning the valve clockwise. Its only effect is to break the connection between main reservoir port 1 and brake cylinder port 9, to pevent the further increase of pressure in the engine brake cylinder while maintaining the pressure already therein. All other ports are in the same condition as in the previous position.

(9). Engine application and train full release position, shown in Fig. 12. This position can be reached either from service application position, in which case it holds the engine brakes applied and releases the train brakes, or can be reached from running position, in which case the engine brakes are applied. As here shown, the main reservoir port 1 is connected to brake cylinder port 9 by cavity 17, so that in case the engine brakes have been applied, they are so held; and if they have not been previously applied, they are applied thereby. Main reservoir ports 1 and 3 are connected by cavity 11 to train pipe port 2 and equalizing reservoir port 5, thereby charging both train pipe and equalizing reservoir, and releasing the train brakes if they have been set, or holding them released in case they were not applied. Warning port 10 is also open, as is also emergency cut-off valve port 6. All other ports are blanked.

(10). Train release and engine lap position, shown in Fig. 13. This position is assumed after service application by rotating the valve to the full extent clockwise, and results in releasing the train brakes while holding the engine brakes. The large cavity 11 connects main reservoir ports 1 and 3 with train pipe port 2 and with equalizing reservoir port 5, thus charging both the train pipe and equalizing reservoir and releasing the train brakes. The brake cylinder port 9 and by-pass release pipe port 8 are, however, both blanked, so that the engine brakes are held applied. The warning port 10 is open in this position acting as a signal to the engineer.

The valve described is normally set in running position. Service and emergency applications are made in the usual way by moving the valve contra-clockwise to the desired degree. After an emergency application the valve is invariably brought back to full release position to quickly charge the train pipe and equalizing reservoir and release the brakes. After service application the valve can either be brought back to full release position to release the brakes, after which the valve is again set in running position, or it may be set in various other positions; for instance, when it is desired to hold the brakes on the train and engine after service application, the valve is brought back to positive lap position; if it is desired to release the engine brakes while holding the train brakes, the valve is brought back to position No. 6, Fig. 9, that is, engine release and train lap position; and if it is desired to hold the engine brakes and release the train brakes, the valve is brought back to position No. 7, Fig. 10, engine application and train release position. Position No. 7 can also be reached from running position whenever it is desired to apply only the engine brakes. From position No. 7 the valve is moved to position No. 8, or engine lap position, Fig. 11, when the engine brakes reach the desired pressure and when it is desired to hold said brakes applied. Position No. 9 corresponds in its functional effects to position No. 7, with the difference that in position No. 7 the train pipe and equalizing reservoir ports are open only to main reservoir port 3 and therefore receive merely the pressure of the main reservoir as reduced by the feed valve, whereas, in position No. 9 the train pipe port and equalizing reservoir port receive pressure directly from the main reservoir and are, therefore, charged more quickly than in the former position. Position No. 10 has the same relation to position No. 9 that position No. 8 has to position No. 7, to-wit, to lap the applied engine brake port and hold the engine brakes applied, but without increasing the pressure. The valve, therefore, has the usual functions of all engineer's brake valves, that is to say, to apply the brakes on the engine and throughout the train simultaneously either in service or emergency applications, to hold said brakes applied, and to release said brakes, as well as providing for releasing the engine brakes without releasing the train brakes, or releasing the train brakes while holding the engine brakes applied. It, therefore, gives full control of engine and train brakes either simultaneously or independently and enables the various combinations to be effected from any position of the valve. The valve is of the usual type and no complications of construction or operation have been introduced. There is sufficient lapping in the various positions to prevent leakage, and wear of the parts is no greater than with the standard type of engineer's brake valves now in use.

Emergency cut-off valve port 6 is open to main reservoir pressure in all positions of the brake valve except in emergency position. Consequently, in all other positions of the valve, in case of a break in the train line fluid pressure will pass through port 6 to the emergency cut-off valve and cut off the steam supply to the engine cylinders and also apply the engine brakes. When the valve is in emergency position, steam is cut off directly by the flow of pressure from the main reservoir port 1 through cavity 15 to port 7.

Figure 5:
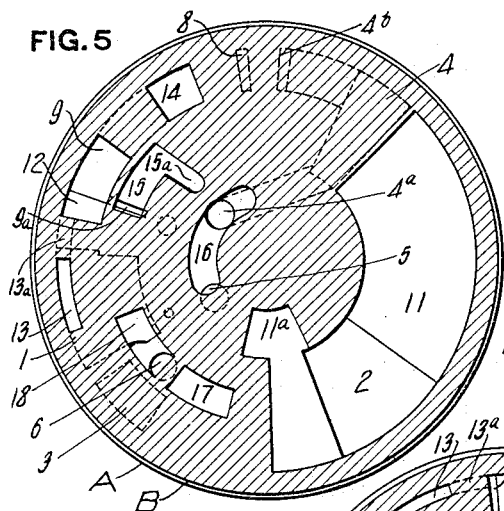
Figure 6:
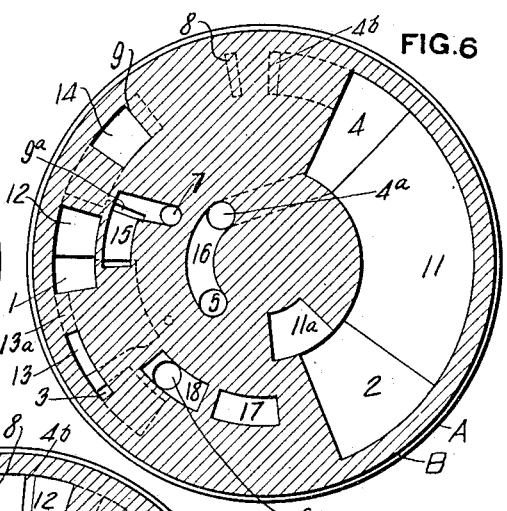
Figure 7:
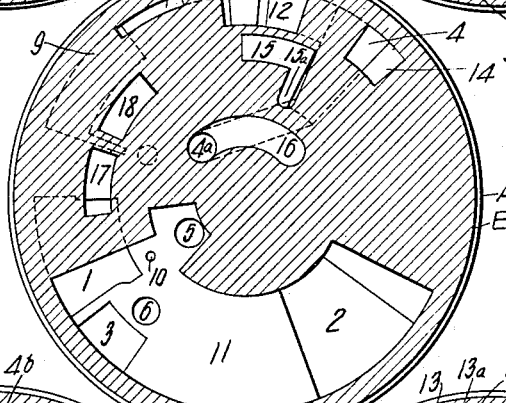
Figure 12:
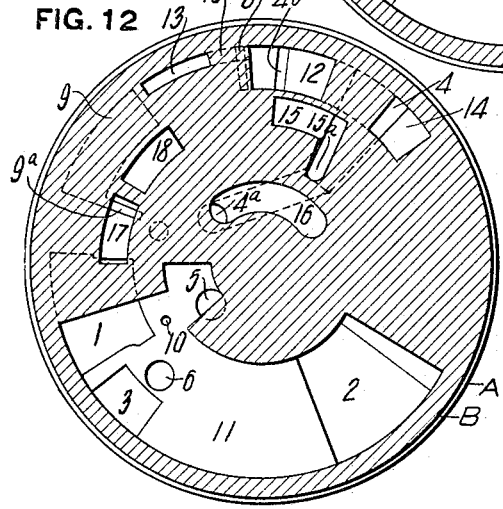
Figure 13:
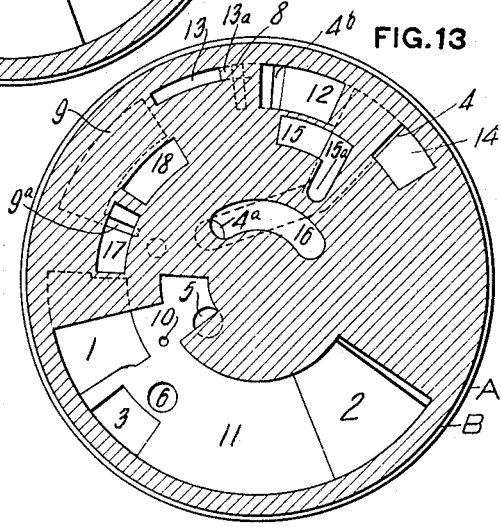

The warning port 10 is open in full release position, Fig. 7; train release and engine application position, Fig. 12; and train release and engine lap position, Fig. 5, in which three positions the main reservoir port 1 is directly connected to the train pipe port 2 so that there is danger of overcharging the train pipe if the valve is allowed to remain too long in either of these positions. The escape of air through the small port 10 advises the engineer that the valve is in such position that overcharge of train line is likely to occur if the valve is allowed to remain too long in that position.

The system for which the valve illustrated and described is particularly designed, and which shows the several connections referred to hereinbefore, is illustrated, described and claimed in my application filed April 10, 1912, Serial No. 689,753.

What I claim is:

1. An engineer's brake valve having the usual connections to the main reservoir, the train pipe and the atmosphere, and also having a small warning port to the atmosphere, and a movable member provided with cavities and passages coöperating with said ports and arranged to connect the several ports to set and release the brakes, and also so arranged that in a plurality of positions it connects the main reservoir port directly to the train pipe port and opens the small warning port to the atmosphere.

2. An engineer's brake valve having ports connected to the atmosphere and the train pipe, and having one port connected directly with the main reservoir and a second port connected to the main reservoir by way of a pressure reducing or feed valve, and also having a small warning port to the atmosphere, and a movable member provided with cavities and passages coöperating with said ports and arranged to connect said ports to apply and release the brakes and arranged in running position of the valve to connect the train pipe port to the main reservoir port by way of the feed valve, and in a plurality of positions to connect the main reservoir to the train pipe and open the small warning port to the atmosphere.

3. An engineer's brake valve provided with ports connected to the atmosphere, and the train pipe, and having a port connected to a brake cylinder, a port connecting directly with the main reservoir, and another port connecting to the main reservoir by way of a feed or pressure reducing valve, and a movable member provided with cavities and passages coöperating with said ports and arranged to apply and release the brakes, and in one position arranged to connect the main reservoir port to the brake cylinder port and simultaneously connect the train pipe port to the main reservoir by way of the reducing valve, and in another position to connect the main reservoir port with the brake cylinder port and connect the train pipe directly to the main reservoir.

4. An engineer's brake valve provided with ports connected to the atmosphere, and the train pipe, and having a port connected to a brake cylinder, a port connecting directly with the main reservoir, and another port connecting to the main reservoir by way of a feed or pressure reducing valve, and a movable member provided with cavities and passages arranged to coöperate with the ports to apply and release the brakes, and in one position arranged to connect the main reservoir port to the brake cylinder port and simultaneously connect the train pipe port to the main reservoir by way of the reducing valve, and in another position to connect the main reservoir port with the brake cylinder port and connect the train pipe directly to the main reservoir, and in two positions adjacent to the two positions last named lapping the brake cylinder port while maintaining all of the other connections.

5. An engineer's brake valve having ports connected to the atmosphere, the main reservoir, the train pipe, and an emergency cut-off valve, and a movable member having cavities and passages coöperating with said ports and arranged in different positions to apply the brakes for service and emergency applications and to release the same, and also arranged so that in all positions of the valve, except the emergency position, the main reservoir is connected to the emergency cut-off valve.

6. An engineer's brake valve having ports connected to the atmosphere, the main reservoir, the train pipe, an emergency cut-off valve, and a steam cut-off valve, and a movable member having cavities and passages coöperating with said ports and arranged in different positions to apply the brakes for service and emergency applications and to release the same, and also arranged so that in all positions of the valve, except emergency position, the main reservoir is connected to the emergency cut-off valve port, while in emergency position the main reservoir is connected directly to the steam cut-off valve port.

7. An engineer's brake valve having ports connected to the atmosphere, the main reservoir, the train pipe, an equalizing reservoir, and a brake cylinder, and a movable member provided with cavities and passages coöperating with said ports and arranged in one position to connect the equalizing reservoir port to the atmosphere and simultaneously connect the main reservoir port to the brake cylinder port, in another position to connect the brake cylinder port to the atmosphere and lap the equalizing reservoir and train pipe ports, and in another position to connect the brake cylinder port with the main reservoir port and simultaneously connect the main reservoir port to the train pipe.

8. An engineer's brake valve having ports connected to the atmosphere, the main reservoir, the train pipe, an equalizing reservoir, and a brake cylinder, and a movable member provided with cavities and passages coöperating with said ports and arranged in one position to connect the equalizing reservoir port to the atmosphere and simultaneously connect the main reservoir port to the brake cylinder port, in another position to connect the brake cylinder port to the atmosphere and lap the equalizing reservoir and the train pipe ports, in another position to connect the brake cylinder port with the main reservoir port and simultaneously connect the main reservoir port to the train pipe, in another position to lap all ports, and in still another position to lap the brake cylinder port while maintaining the connection from the main reservoir port to the train pipe port.

9. An engineer's brake valve having ports connected to the atmosphere, the train pipe, an equalizing reservoir, a brake cylinder, and two ports connected to the main reservoir, one directly and the other by way of a pressure reducing or feed valve, and a movable member having cavities and passages coöperating with said ports and arranged in one position to connect the equalizing reservoir port to the atmosphere and simultaneously connect the main reservoir port with the brake cylinder port, in another position to connect the brake cylinder port with the atmosphere and simultaneously lap the train pipe and equalizing reservoir ports, and in another position to connect the main reservoir port with the brake cylinder port and simultaneously connect the equalizing reservoir and train pipe ports to the main reservoir by way of the feed valve.

10. An engineer's brake valve having ports connected to the atmosphere, the train pipe, an equalizing reservoir, a brake cylinder, and two ports connected to the main reservoir, one directly and the other by way of a pressure reducing or feed valve, and a movable member having cavities and passages coöperating with said ports and arranged in one position to connect the equalizing reservoir port to the atmosphere and simultaneously connect the main reservoir port with the brake cylinder port, in another position to connect the brake cylinder port with the atmosphere and simultaneously lap the train pipe and equalizing reservoir ports, in another position to connect the main reservoir port with the brake cylinder port and simultaneously connect the equalizing reservoir ports and train pipe ports to the main reservoir by way of the feed valve, in another position to lap all ports, and in still another position to lap the brake cylinder port while connecting the train pipe and equalizing reservoir ports with the main reservoir by way of the feed valve.

11. An engineer's brake valve having ports connected to the atmosphere, the train pipe, an equalizing reservoir, a plurality of ports connected to a brake cylinder, and a pair of ports connected to a main reservoir, one directly and the other by way of a feed valve, a movable member provided with cavities and passages coöperating with said ports and arranged in one position to connect a brake cylinder port with the atmosphere and directly connect the main reservoir, the train pipe and the equalizing reservoir ports, in another position to connect the brake cylinder port with the atmosphere and simultaneously connect the train pipe and equalizing reservoir ports with the main reservoir by way of the feed valve, in another position to connect the equalizing reservoir port with the atmosphere and simultaneously connect the main reservoir port with a brake cylinder port, in another position to connect both the train pipe port and the equalizing reservoir port to the atmosphere, and simultaneously connect the main reservoir port with a brake cylinder port, in another position to connect a brake cylinder port with the atmosphere and disconnect both the train pipe port and the equalizing reservoir port from the main reservoir and in another position to connect the main reservoir port to a brake cylinder and simultaneously connect both the train pipe port and the equalizing reservoir port to the main reservoir by way of the reducing valve.

12. An engineer's brake valve having ports connected to the atmosphere, the train pipe, an equalizing reservoir, a plurality of ports connected to a brake cylinder, and a pair of ports connected to the main reservoir, one directly and the other by way of the feed valve, a movable member provided with cavities and passages coöperating with said ports and arranged in one position to connect the brake cylinder port with the atmosphere and directly connect the main reservoir, the train pipe and the equalizing reservoir ports, in another position to connect the brake cylinder port with the atmosphere and simultaneously connect the train pipe and equalizing reservoir ports with the main reservoir by way of the feed valve, in another position to connect the equalizing reservoir port with the atmosphere and simultaneously connect the main reservoir port with a brake cylinder port, in another position to connect both the train pipe port and the equalizing reservoir port to the atmosphere and simultaneously connect the main reservoir port with a brake cylinder port, in another position to connect a brake cylinder port with the atmosphere and disconnect both the train pipe port and the equalizing reservoir port from the main reservoir, in another position to connect the main reservoir port to a brake cylinder port and simultaneously connect both the train pipe port and the equalizing reservoir port to the main reservoir by way of the reducing valve, and in another position to connect the main reservoir port to a brake cylinder port and simultaneously connect the train pipe port and the equalizing reservoir port directly to the main reservoir.

13. An engineer's brake valve having ports connected to the atmosphere, the train pipe, an equalizing reservoir, a plurality of ports connected to a brake cylinder, and a pair of ports connected to the main reservoir, one directly and the other by way of a feed valve, a movable member provided with cavities and passages coöperating with said ports and arranged in one position to connect a brake cylinder port with the atmosphere and directly connect the main reservoir, the train pipe and equalizing reservoir ports, in another position to connect the brake cylinder port with the atmosphere and simultaneously connect the train pipe and equalizing reservoir ports with the main reservoir by way of the feed valve, in another position to connect the equalizing reservoir port with the atmosphere and simultaneously connect the main reservoir port with a brake cylinder port, in another position to connect both the train pipe port and the equalizing reservoir port to the atmosphere and simultaneously connect the main reservoir port with a brake cylinder port, in another position to connect a brake cylinder port with the atmosphere and disconnect both the train pipe port and the equalizing reservoir port from the main reservoir, in another position to connect the main reservoir port to a brake cylinder port and simultaneously connect both the train pipe port and the equalizing reservoir port to the main reservoir by way of the reducing valve, in another position to lap the brake cylinder and the train pipe and equalizing reservoir ports, and in still another position to lap the brake cylinder port while maintaining connection between the train pipe and equalizing reservoir ports to the main reservoir by way of the reducing valve.

14. An engineer's brake valve having ports connected to the atmosphere, the train pipe, an equalizing reservoir, a plurality of ports connected to a brake cylinder, and a pair of ports connected to the main reservoir, one directly and the other by way of a feed valve, a movable member provided with cavities and passages coöperataing with said ports and arranged in one position to connect a brake cylinder port with the atmosphere and directly connect the main reservoir, the train pipe and the equalizing reservoir ports, in another position to connect the brake cylinder port with the atmosphere and simultaneously connect the train pipe and equalizing reservoir ports with the main reservoir by way of the feed valve, in another position to connect the equalizing reservoir port with the atmosphere and simultaneously connect the main reservoir port with a brake cylinder port, in another position to connect both the train pipe port and the equalizing reservoir port to the atmosphere and simultaneously connect the main reservoir port with a brake cylinder port, in another position to connect a brake cylinder port with the atmosphere and disconnect both the train pipe port and the equalizing reservoir port from the main reservoir, in another position to connect the main reservoir port to a brake cylinder port and simultaneously connect both the train pipe port and the equalizing reservoir port to the main reservoir port by way of the reducing valve, in another position to connect the main reservoir port to a brake cylinder port and simultaneously connect the train pipe and the equalizing reservoir ports directly to the main reservoir, in another position to lap the brake cylinder, the train pipe and the equalizing reservoir ports, and in still another position to lap the brake cylinder port while maintaining connection between the train pipe and auxiliary reservoir ports to the main reservoir by way of the feed valve.

In testimony whereof, I have hereunto set my hand.

JACOB RUSH SNYDER.

Witnesses:
F. W. WINTER,
WILLIAM B. WHARTON.

Copies of this patent may be obtained for five cents each, by addressing the "Commissioner of Patents, Washington, D. C."